US006009629A

United States Patent [19]
Gnepf et al.

[11] Patent Number: 6,009,629
[45] Date of Patent: Jan. 4, 2000

[54] PROCESS FOR DETERMINING THE DIRECTION OF THE EARTH'S MAGNETIC FIELD

[75] Inventors: Silvio Gnepf, Heerbrugg; Juerg Weilenmann, Widnau, both of Switzerland

[73] Assignee: Leica Geosystems AG, Heerbrugg, Switzerland

[21] Appl. No.: 08/945,797

[22] PCT Filed: Feb. 10, 1997

[86] PCT No.: PCT/EP97/00583

§ 371 Date: Nov. 10, 1997

§ 102(e) Date: Nov. 10, 1997

[87] PCT Pub. No.: WO97/34125

PCT Pub. Date: Sep. 18, 1997

[30] Foreign Application Priority Data

Mar. 13, 1996 [DE] Germany .................. 196 09 762

[51] Int. Cl.⁷ .................................................. G01C 17/38
[52] U.S. Cl. .................. 33/357; 33/356; 702/92
[58] Field of Search .................. 33/357, 304, 313, 33/316, 319, 321, 355 R, 356; 702/92, 150

[56] References Cited

U.S. PATENT DOCUMENTS

| | | | |
|---|---|---|---|
| 4,698,912 | 10/1987 | Fowler et al. ............... | 33/356 |
| 4,733,179 | 3/1988 | Bauer et al. ............... | 33/356 |
| 4,807,462 | 2/1989 | Al-Attar ................... | 33/356 |
| 4,866,627 | 9/1989 | Suyama .................... | 33/356 |
| 5,187,872 | 2/1993 | Dufour .................... | 33/356 |
| 5,349,529 | 9/1994 | Masumoto et al. ............ | 33/355 R |

Primary Examiner—Christopher W. Fulton
Attorney, Agent, or Firm—Foley & Lardner

[57] ABSTRACT

A method for determining the direction of the Earth's magnetic field, which may be interfered with by magnetic materials built into equipment and by electric currents, using an electronic magnetic compass which contains three magnetic field sensors and two devices for measuring inclination is provided. The electronic magnetic compass is arranged in N different spatial positions, in each of these N positions, the inclination sensor signals and the magnetic field sensor signals being measured and inclination values and magnetic field values being determined from these signals. On the basis of these inclination values and magnetic field values, the magnitude of the Earth's magnetic field vector is determined using the vector equation $$\text{const}=b_g=b_E\sin(i)=g^T L(b_E)=g^T m(b_{mes}-b_o)$$

with $b_g$ = magnetic field component parallel to the gravitation vector $g$ $L(b_E)$ = length of the magnetic field vector $b_E$ $b_{mes}$ = measured magnetic field vector $b_E$ = actual Earth's magnetic field vector at the measurement site $\Delta M$ = soft magnetic field distortion, i.e. magnetism induced by the Earth's magnetic field $M = I + \Delta M$ with $I$ = unit matrix $b_o$ = hard magnetic spurious field vector $i$ = inclination angle N having to be at least equal to the number of parameters to be determined in the vector equation.

8 Claims, 1 Drawing Sheet

PROCESS FOR DETERMINING THE DIRECTION OF THE EARTH'S MAGNETIC FIELD

CROSS-REFERENCE TO RELATED APPLICATION

This application is the national stage application of PCT/EP97/00583, filed Feb. 10, 1997, which is entitled to priority of German Application No. 196 09 762.2-52, filed Mar. 13, 1996.

BACKGROUND OF THE INVENTION

1. Field of the Invention

The invention relates to a method for determining the direction of the Earth's magnetic field, which may be interfered with by magnetic materials built into equipment and by magnetic fields produced by electric currents, using an electronic magnetic compass which contains three magnetic field sensors and two devices for measuring inclination.

2. Description of the Related Art

U.S. Pat. No. 4,686,772 discloses an electronic magnetic compass which, for example, is intended to be used to determine the heading of a tank. The tank has two iron bodies, namely the turret and the vehicle body, which can rotate relative to one another about a vertical axis. The magnetic compass is arranged in the vehicle body and comprises a non-pendulous triaxial magnetometer which outputs electrical magnetic field signals that represent the three magnetic field components at the site of the magnetometer. Two inclination sensors are provided, which output electrical signals that represent the pitch angle and the roll angle of the vehicle body to which the inclination sensors are fitted. Further, a device for measuring angles provides a rotational angle signal for the angle between the two iron bodies. A plurality of precalibrated correction factors are stored in a memory, these being intended to correct the effect of the magnetic field induced by the vehicle on the measurements by the magnetometer for a plurality of alies of rotation between the two iron bodies. The heading of the tank is calculated in real time using a computer on the basis of the electrical magnetic field signals and the signals from the inclination sensors, which have been corrected by the stored correction factors for the corresponding angle of rotation.

Before the described magnetic compass can be used, it is necessary to carry out calibration measurements. To do this, the vehicle is arranged on at least two different planes which are not parallel to one another. In these situations, measurements of the azimuthal angle, the pitch angle and the roll angle are taken for different orientations of the vehicle body but the same relative orientation of the tank turret. In order to make it possible to measure the last angle, a theodolite, for example, is necessary. During the calibration, it is assumed that the Earth's magnetic field at the site of the measurement is known. To do this, the values of the magnetic inclination and declination of the Earth's magnetic field for the respective measurement site are taken from cartographic sources.

U.S. Pat. No. 4,539,760 describes an electronic magnetic compass for vehicles, which has three magnetic sensors. They respond to the three orthogonal components of a magnetic field which includes the Earth's magnetic field and an additional spurious field connected with the vehicle. The magnetic sensors produce electrical signals corresponding to the components. Further, inclination sensors respond to the inclination of the vehicle with respect to the horizontal plane. A data processing unit and a memory are used to store signals which are derived as calibration correction values from the measuring sensors when the vehicle is rotated through a circle in order to calibrate the magnetic compass. In order to exclude the effect of the magnetic spurious field, the data processing unit calculates corrected values for the Earth's magnetic field at the site of the vehicle, after the calibration process has been completed and by taking the calibration correction values into account. The azimuth of the direction of travel of the vehicle is then calculated on the basis of these corrected values, using the values from the inclination sensors which are used to determine the horizon. During the calculations, it is assumed that the correction matrix is symmetric. This is true only in the rarest of cases, if ever.

SUMMARY OF THE INVENTION

The object of the invention is to provide a method for determining the direction of the Earth's magnetic field using an electronic magnetic compass, which is more straightforward to carry out.

Advantageous refinements of the subject matter of the invention are also disclosed.

Advantageously, the method according to the invention does not require any specific calibration measurements using additional measuring equipment. Neither is it necessary to input special data in the case of the electronic magnetic compass in order to prepare it for use. It is merely necessary to arrange the magnetic compass in arbitrary different positions in space. In each position in space, three magnetic field components are preferably determined. These magnetic field components may be mutually orthogonal, if desired, but do not have to be. Using the inclination values, i.e. the pitch angle and the roll angle, which are additionally measured in each position in space, it is possible to determine the direction of the actual magnetic field vector of the Earth's field from the respective magnetic field components.

The method according to the invention does not require the electronic magnetic compass to be calibrated before it is used. Using the method according to the invention, not only magnetic spurious fields but also manufacturing tolerances, varying sensitivities of the sensors, etc. are taken into account. It is therefore unnecessary to use a magnetic compass already calibrated by the manufacturer.

In the method according to the invention, use is made of the fact that the angle of inclination between the gravitation vector and the Earth's magnetic field vector at the respective fixed site remains constant independently of the instantaneous position of the system.

BRIEF DESCRIPTION OF THE DRAWINGS

In order to make the invention easier to understand, figures are provided in which FIG. 1 schematically shows an arrangement of an electronic magnetic compass and soft- and hard-magnetic spurious field sources.

DESCRIPTION OF SPECIFIC EMBODIMENTS

As early as the 19th century, Poisson addressed the problem of how to measure the magnetic field which is actually present if a magnetometer is set up in a system which itself has magnetic components. Poisson's formula, which describes this situation, expresses the idea that, in such a case, the magnetic field which is measured is a linear function of the field that is actually present, and an affine transformation is thus involved. In conjunction with this, reference may be made to the abovementioned U.S. Pat. No. 4,686,772, column 2, lines 26 to 30.

For the general case, it can be stated that the measured magnetic field is composed of the soft-magnetically distorted Earth's magnetic field at the measurement site and of a hard-magnetic component. The soft-magnetically distorted Earth's magnetic field involves magnetism induced by the Earth's magnetic field. The hard magnetic component comprises, for example, magnetic fields which are constant at the site of the magnetometer and are produced by permanent magnets or electric currents in the system. The hard magnetic component cannot be affected by a change in the external field.

In a somewhat different form, the abovementioned Poisson's formula can be written mathematically as:

$$b_{mes} = Mb_E + b_O = b_E + \Delta M b_E + b_O \qquad (1)$$

with:

$b_{mes}$ = measured magnetic field vector $b_E$ = actual Earth's magnetic field vector at the measurement site $\Delta M$ = soft magnetic field distortion, i.e. magnetism induced by the Earth's magnetic field, where $M = I + \Delta M$; $I$ = unit matrix $b_0$ = hard magnetic component.

In what is written above, and in the following explanations, vectors and matrices are written in bold letters. The vectors are conventionally related to a Cartesian coordinate system. The matrices are generally 3×3 matrices.

Figure 1:
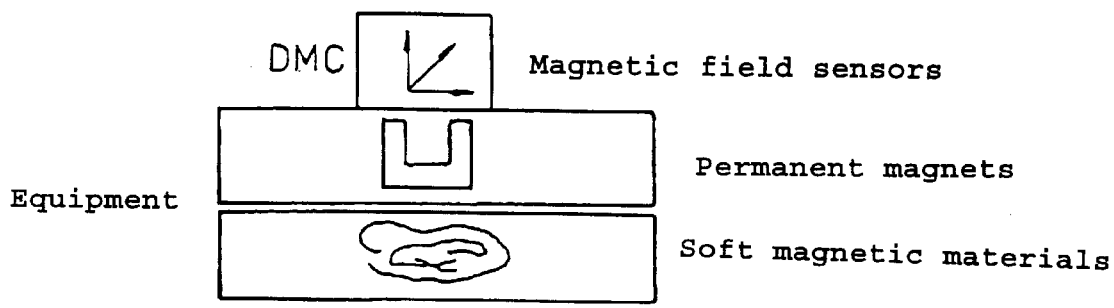
Figure 2:
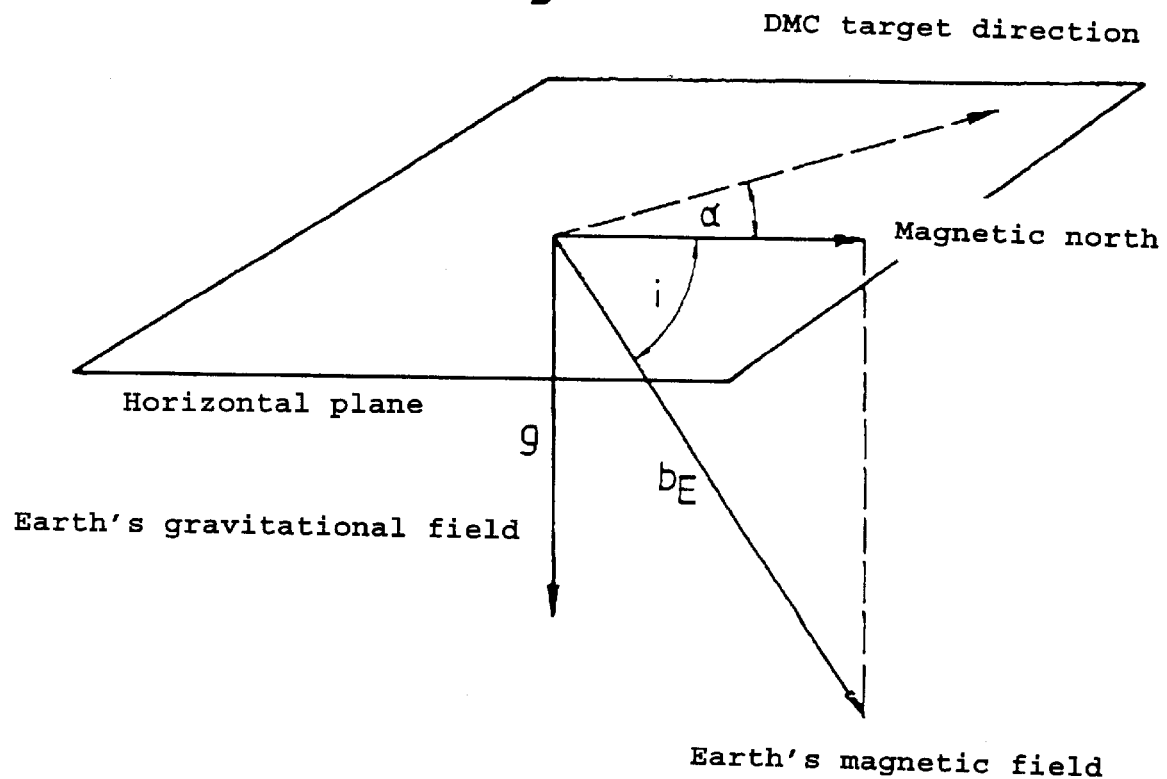
FIG. 2 represents the vectors relevant for measuring the Earth's magnetic field.

FIG. 1 schematically represents the fact that the magnetic compass DMC is arranged in equipment where permanent magnets, as hard magnetic interference sources, and soft magnetic materials interact and affect the value measured by the DMC. FIG. 2 represents the vectors relevant for measuring the Earth's magnetic field and the relevant projections into the horizontal plane. In the case of a magnetic compass arranged fixed in a vehicle, the target direction corresponds to the heading.

The electronic magnetic compass has three magnetic field sensors and two inclination sensors, the former determining three magnetic field components which need not necessarily be mutually orthogonal.

The permanent magnets and the electric currents produce a field which is fixed at the site of the magnetic field sensors and has the effect of an offset of the coordinate system formed by the magnetic field components.

From a field which is present, the soft magnetic materials produce an attenuated or amplified field in the field direction and, in addition, field components in the directions perpendicular thereto. This can be regarded as "crosstalk" between the field directions x, y and z.

The same equations as above again arise when considering a magnetometer which has three non-orthogonal magnetic field sensors with different sensitivity and an offset, for example an uncalibrated "raw" magnetometer from the manufacturer.

The measurement of the magnetic field using a "raw" magnetometer of this type can be expressed mathematically as follows:

$$b_{mes,i} = f_i e_i b_{E,i} + o_i; i = x, y, z$$

with $f_i$ the gain, $e_i$ the measurement direction, i.e. the unit vector, and $o_i$ the offset of the i-th sensor.

Writing $f_i e_i = (M_{i1}, M_{i2}, M_{i3})$ and $o_i = b_{oi}$ again gives the above equation (1).

In order to determine the value of the Earth's true magnetic field, it is necessary to solve the abovementioned vector equation (1) for $b_E$. Inversion and subtraction give:

$$b_E = M^{-1}(b_{mes} - b_o) = m(b_{mes} - b_o) \qquad (2)$$

with $m = M^{-1}$

In order to determine the unknown values M or $m = M^{-1}$ and $b_o$ from equation (1) or (2), a solution method as disclosed by the abovementioned U.S. Pat. No. 4,686,772 may be adopted. It is assumed therein that, in each case, the Earth's magnetic field vector $b_E$ is explicitly known in addition to the measured magnetic field vector $b_{mes}$. The vector equations (1) and (2) in each case represent a linear equation system for the unknowns $M_{ij}$ or $m_{ij}$ and $b_{oi}$. Through measurements in at least four geometrically different positions, the $M_{ij}$ and $b_{oi}$ are given directly, with a known value of the Earth's magnetic field, using elementary methods for solving linear equation systems.

The solution specified in the abovementioned U.S. Pat. No. 4,539,760 is based on the fact that the magnitude of the Earth's magnetic field is independent of the position of the magnetometer. If the values $m_{ij}$ and $b_o$ have been determined correctly, then a result for the Earth's magnetic field vector $b_E$ is found which has the same length for each position of the magnetometer. This gives:

$$\text{const} = b_E^2 b_E^T b_E = (b_{mes} - b_o)^T m^T m (b_{mes} - b_o) = (b_{mes} - b_o)^T U (b_{mes} - b_o) \qquad (3)$$

With $U^T = U$, which means that U is a symmetric matrix.

It can be directly seen that, using this equation (3), it is only possible to calculate the product $U = m^T m$ of the desired matrix m. Only if it is assumed that this matrix is symmetric, and with the supposition that the diagonal is positive, can the elements of this matrix be calculated. However, the former assumption is true only in the rarest of cases, since it would imply a soft magnetic symmetry, which is extremely improbable in technical equipment, for example an aircraft or motor vehicle.

According to the invention, the approach then adopted for determining the value $b_E$, i.e. to solve the vector equation, is one in which use is made of the fact that, for each position of the measuring system at a given geographical site, the angle between the horizontal plane and the Earth's magnetic field, i.e. the inclination angle, remains constant. This is then clearly also true for the angle between the direction of the gravitation vector g and the Earth's magnetic field vector $b_E$. The following can thus be written:

$$\text{const} = b_g = L(b_E) \sin(i) = g^T b_E = g^T m (b_{mes} - b_o) \qquad (4)$$

with $b_g$ = magnetic field component parallel to the gravitation vector g $L(b_E)$ = length of the magnetic field vector $b_E$ in which i is the inclination angle.

This equation means that the component of the magnetic field vector in the direction of the Earth's gravitational field, that is to say perpendicular to the horizontal plane, remains the same for all positions of the system.

The value m occurs linearly in this equation, and not as a product. The gravitation vector g can be determined using the inclination sensors.

For this reason, this value m can be calculated directly, without needing to take a measurement of the field, as in the abovementioned U.S. Pat. No. 4,686,772, or having to assume special symmetry conditions, as in the abovementioned U.S. Pat. No. 4,539,760.

The number of parameters to be determined is:

m=3×3=9

$b_o$=3

$b_g$=1.

This gives a total of 9+3+1=13 parameters, determination of which requires at least 13 equations.

An arbitrary scale factor can further be selected as disclosed, for example, by the abovementioned U.S. Pat. No. 4,539,760 (column 4, line 3 et seq.). Possible ways of defining the scale include, for example, those in the following list:

$b_g$=const.

$m_{11}$=const.

$m_{11}+m_{22}+m_{33}$=const.

$m_{11}^2+m_{22}^2+m_{33}^2$=const.

$m_{11}^2+m_{12}^2+\ldots+m_{33}^2$=const.

det m=const.

or other suitable ones, it also being possible for the constant to be selected as 1. The definition of the scale reduces the number of parameters by 1, so that only 12 parameters then remain, for which a corresponding number of equations is needed. During the initial calibration of the magnetic compass, 12 different geometrical positions j=1, . . . , 12 are adopted therefor, in which the three magnetic field components and the two inclination angles are measured.

A linear equation system:

$$b_g = g_j^T m(b_{mes,j} - b_o) = g_j^T m b_{mes,j} - g_j^T u_o \quad (5)$$

is obtained, with $u_o = m b_o$ and, for example, $b_g=1$ which then explicitly gives:

$$1 = g_{j1}b_{mes,1}m_{11} + g_{j1}b_{mes,2}m_{12} + \ldots$$
$$\ldots + g_{j1}u_{o1} + g_{j2}u_{o2} + g_{j3}u_{o3}$$

If more than 12 equations are available then, for example, the best fit can be determined in this case using the generally known least squares method.

Within the scope of the invention, it is also possible to use the fact that the inclination angle or $b_g$ is constant for a given fixed site, together with the fact that the magnetic field vector has a constant length $L(b_E)=|b_E|\equiv$In other words, this means that not only equation (5) which was given above but also equation (3) can be used for the method. In this case, the parameter $L(b_E)$ must also be determined, so that the number N of parameters and therefore the number of measurements needed is increased by 1 to N=13.

Advantageously, using equations (3) and (5) provides better utilization of the available data, since each measurement is used in two equations. The number of measurements needed is therefore halved. In order to carry out this method, it is necessary to use a statistical fitting calculation which, for example, may be based on the least squares method.

In the method described below, the abovementioned equations (3) and (5) are used in statistically correct fashion.

The relationship which exists between the magnetic field sensor signals $\mu_{ij}$: i=1, 2, 3 and the Earth's magnetic field vector $b_{Ej}$, will be explained in more detail below. It can be represented by the equation $$\mu_j = \mu_o + M b_{Ej} + \epsilon_j; j=1, \ldots N$$

(Measuring Positions)

$$\mu_j = \begin{pmatrix} \mu_{1j} \\ \mu_{2j} \\ \mu_{3j} \end{pmatrix}$$

measured values from the 3 magnetic field sensors in position j $$\mu_0 = \begin{pmatrix} \mu_{01} \\ \mu_{02} \\ \mu_{03} \end{pmatrix}$$

vector for offset and hard magnetic spurious field $$M = \begin{pmatrix} M_{11} & M_{12} & M_{13} \\ M_{21} & M_{22} & M_{23} \\ M_{31} & M_{32} & M_{33} \end{pmatrix}$$

soft magnetic distortion matrix $b_{Ej}$ = Earth's magnetic field vector $\epsilon_j$ = stochastic vector which represents the noise of the sensors $\langle \epsilon_j \rangle = 0; \langle \epsilon_j \epsilon_j^T \rangle = \sigma_\mu^2 I_3; \langle \epsilon_j \epsilon_k^T \rangle = 0 \quad j \neq k;$ $\langle \rangle$ = statistical expectation The components of the Earth's magnetic field vector $b_{Ej}$ are unknown in the various positions of the magnetic compass. It is, however, possible to describe them partially using the inclination sensors. In this case, each of the two inclination sensors measures one component of the gravitational field vector normalized to 1. The direction of this vector is vertical.

$b_{Ej} = s g_j + c \eta_j$ $s = \sin(i); c = \cos(i)$ $|b_{Ej}| = 1$ Earth's magnetic field strength = 1

$i$ = inclination angle of the Earth's magnetic field $\eta_j = \cos(\alpha_j) e_j + \sin(\alpha_j) f_j;$ $\alpha_j$ being the azimuthal angle, that is to say the angle of rotation of the coordinate system intrinsic to the sensor with respect to a spatially fixed coordinate system in the horizontal plane $g_j$ = gravitation vector $|g_j| = 1$ $$g_j = \begin{pmatrix} g_{1j} \\ g_{2j} \\ g_{3j} \end{pmatrix};$$

-continued $$e_j = (1 - g_{1j}^2)^{-1/2} \begin{pmatrix} 1 - g^2 \\ -g_{1j}g_{2j} \\ -g_{1j}g_{3j} \end{pmatrix};$$

$$f_j = (1 - g_{1j}^2)^{-1/2} \begin{pmatrix} 0 \\ -g_{3j} \\ g_{2j} \end{pmatrix}$$

$g_{1j}$, $g_{2j}$: measured values from the inclination sensors, $g_{3j} = (1 - g_{1j}^2 - g_{2j}^2)^{1/2}$ The values of the parameters $M_{11} \ldots M_{33}$, $\mu_{01}, \mu_{02}, \mu_{03}$, $\alpha_1 \ldots \alpha_N$ and i can be determined using an optimization calculation known per se, for example by finding the minimum for the statistical sum $$L(M, \mu_0, \alpha_1 \ldots \alpha_N, i) = \sum_{j=1}^{N} (\mu_j - \mu_0 - Mb_{Ej})^2$$

Various other solution methods are possible in the scope of the invention, for example using Kalman filters, fuzzy logic or neural networks.

It can thus be seen that there is a substantial mathematical simplification if the value $\Delta M = 0$. This is the case when no soft magnetic spurious field needs to be taken into account. M then corresponds to the unit matrix.

In the above description, reference was made to inclination sensors. Instead of these, it is also possible to use two orthogonally mounted encoders. These would be used to measure angles with respect to a reference point. In practical embodiment, however, it would then be necessary to provide a frame which is mounted fixed, and with respect to which the magnetic compass and the interfering system would rotate.

It would also be possible to determine the desired inclination angles using two rotational speed sensors, i.e. gyros, fitted to the system. The angles of rotation can be derived by integrating the rotational speed information.

We claim:

1. Method for determining the direction of the Earth's magnetic field, which may be interfered with by magnetic materials built into equipment and by magnetic fields produced by electric currents, using an electronic magnetic compass which contains three magnetic field sensors and two devices for measuring inclination, the electronic magnetic compass being arranged in N different spatial positions, in each of these N positions, the signals from the devices for measuring inclination and the signals from the magnetic field sensors being measured and inclination values and magnetic field values being determined from these signals, and on the basis of these inclination values and magnetic field values, the magnitude of the Earth's magnetic field vector being calculated using the vector equation $$\text{const} = b_g = L(b_E) \sin(i) = g^T b_E = g^T m (b_{mes} - b_o)$$

with $b_g$ = magnetic field component parallel to the gravitation vector $g$ $L(b_E)$ = length of the magnetic field vector $b_E$ $b_{mes}$ = measured magnetic field vector $b_E$ = actual Earth's magnetic field vector at the measurement site $\Delta M$ = soft magnetic field distortion, i.e. magnetism induced by the Earth's magnetic field $M = I + \Delta M$ with $I$ = unit matrix $m = M^{-1}$ $b_o$ = hard magnetic spurious field vector $i$ = inclination angle N having to be at least equal to the number of parameters to be determined in the vector equation.

2. Method according to claim 1, characterized in that one of the following scale definitions
$b_g$=const.; $m_{11}$=const.; $m_{11}+m_{22}+m_{33}$=const.;
$m_{11}^2+m_{22}^2+m_{33}^2$=const.;
$m_{11}^2+m_{12}^2+ \ldots +m_{33}^2$=const.; det m=const.; is selected.

3. Method according to claim 1, characterized in that $\Delta M=0$ is set if no soft magnetic spurious field is to be taken into account.

4. Method according to claim 1, characterized in that the magnetic field vector is determined using an optimization calculation if the number N of measurements in the various positions is greater than the number of available equations.

5. Method according to claim 1, characterized in that the magnitude of the Earth's magnetic field vector is determined using a statistical optimization method on the basis of the determined inclination values and magnetic field values with additional use of the equation $$\text{const} = b_E^2 = b_E^T b_E = (b_{mes} - b_o)^T m^T m (b_{mes} - b_o)$$

$b_{mes}$ = measured magnetic field vector $b_E$ = Earth's actual magnetic field vector at the measurement site $\Delta M$ = soft magnetic field distortion, i.e. magnetism induced by the Earth's magnetic field $M = I + \Delta M$; $I$ = unit matrix $m = M^{-1}$ $b_0$ = hard magnetic spurious field vector.

6. Method according to claim 1, characterized in that inclination sensors are used as the devices for measuring inclination.

7. Method according to claim 1, characterized in that rotational speed sensors (gyros) are used as the devices for measuring inclination, the inclination angle being derived by integrating the rotational speed information.

8. Method according to claim 1, characterized in that encoders, with which angles are measured with respect to a reference point, are used as the devices for measuring inclination.

* * * * *